(12) United States Patent
Park et al.

(10) Patent No.: US 10,432,533 B2
(45) Date of Patent: Oct. 1, 2019

(54) AUTOMATIC DETECTION AND PREVENTION OF NETWORK OVERLOAD CONDITIONS USING SDN

(71) Applicant: AT&T Intellectual Property I, L.P., Atlanta, GA (US)

(72) Inventors: Sun-Uk Park, Los Altos, CA (US); Minh Huynh, Fremont, CA (US); Ashima Mangla, San Ramon, CA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 197 days.

(21) Appl. No.: 15/496,557

(22) Filed: Apr. 25, 2017

(65) Prior Publication Data
US 2017/0230297 A1 Aug. 10, 2017

Related U.S. Application Data

(63) Continuation of application No. 14/519,194, filed on Oct. 21, 2014, now Pat. No. 9,674,046.

(51) Int. Cl.
*H04L 12/801* (2013.01)
*H04L 12/24* (2006.01)
*H04L 12/26* (2006.01)

(52) U.S. Cl.
CPC ........ *H04L 47/127* (2013.01); *H04L 41/0681* (2013.01); *H04L 41/0896* (2013.01); *H04L 41/147* (2013.01); *H04L 41/0816* (2013.01); *H04L 43/16* (2013.01)

(58) Field of Classification Search
CPC .................................................. H04L 47/127
See application file for complete search history.

(56) References Cited

U.S. PATENT DOCUMENTS

| | | | |
|---|---|---|---|
| 2,012,022 A | 8/1935 | Richardson | |
| 6,353,594 B1 | 3/2002 | Tooker et al. | |
| 7,711,978 B1 | 5/2010 | Roy et al. | |
| 8,972,604 B1 | 3/2015 | Ramsden-Pogue | |
| 9,106,769 B2 | 8/2015 | Kanode | |
| 2005/0044170 A1* | 2/2005 | Cox | G06F 17/30067 709/217 |
| 2006/0168473 A1 | 7/2006 | Sahoo | |
| 2010/0128653 A1 | 5/2010 | Tateson | |
| 2011/0119530 A1* | 5/2011 | Lazzaro | G06F 11/008 714/39 |

(Continued)

FOREIGN PATENT DOCUMENTS

CA 103346922 A 10/2013

OTHER PUBLICATIONS

English Translation of CA-103346922 to Wang, Wen-yong et al. (2013).

(Continued)

*Primary Examiner* — Andrew C Georgandellis (57) ABSTRACT

A controller node in a network implementing software defined networking (SDN) proactively detects network overload conditions in a target node and subsequently prevents the conditions from developing by launching a new virtual network node. The detection and prevention are based on the determination of a probability of failure of the target node as a weighted function of information from the target node and probabilities of failure of related nodes.

17 Claims, 7 Drawing Sheets

(56) References Cited

U.S. PATENT DOCUMENTS

| | | |
|---|---|---|
| 2013/0128718 A1 | 5/2013 | Appalla et al. |
| 2013/0322252 A1 | 12/2013 | DeCusatis et al. |
| 2014/0101301 A1 | 4/2014 | Wanser et al. |
| 2014/0126410 A1 | 5/2014 | Agarwal et al. |
| 2014/0169189 A1 | 6/2014 | Kalkunte |
| 2014/0215465 A1 | 6/2014 | Elzur |
| 2015/0036504 A1* | 2/2015 | McMurry ............ H04L 47/127 370/236 |
| 2015/0193294 A1 | 7/2015 | Hladik, Jr. |
| 2015/0227426 A1 | 8/2015 | Andrade Costa |

OTHER PUBLICATIONS

Botelho, Fábio, et al. "SMaRtLight: A Practical Fault-Tolerant SDN Controller", University of Lisbon, arXiv preprint arXiv:1407.6062 (2014).

* cited by examiner

| eNodeB | MME | HSS | DRA | SPGW | PCEF | PCRF | Load Balancer | PAS |
|---|---|---|---|---|---|---|---|---|
| CPU % | CPU % | CPU % | CPU % | CPU % | CPU % | CPU % | CPU % | CPU % |
| Mem % | Mem % | Mem % | Mem % | Mem % | Mem % | Mem % | Mem % | Mem % |
| RRC req | Attach rate | Authenticatio n | Clear Loc | Create session | Gx Trans | TPH | Session | MPH |
| PRB usage | Paging rate | Update Loc | Queue Buffer | Delete session | L4 Trans | Session | Ingress rate | IPCAN Session |
| Accessibility | TAU rate | Purge DB | Purge DB | Modify session | L7 Trans | Latency | | |
| Retainabilit y | Handover rate | TPH | MPH | | TCP flows | | | |

| eNodeB | MME | HSS | DRA | SPGW | PCEF | PCRF | Load Balancer | PAS |
|---|---|---|---|---|---|---|---|---|
| CPU % | CPU % | CPU % | CPU % | CPU % | CPU % | CPU % | CPU % | CPU % |
| Mem % | Mem % | Mem % | Mem % | Mem % | Mem % | Mem % | Mem % | Mem % |
| RRC req | Attach rate | Authenticatio n | Clear Loc | Create session | Gx Trans | TPH | Session | MPH |
| PRB usage | Paging rate | Update Loc | Queue Buffer | Delete session | L4 Trans | Session | Ingress rate | IPCAN Session |
| Accessibility | TAU rate | Purge DB | Purge DB | Modify session | L7 Trans | Latency | Throughput | |
| Retainabilit y | Handover rate | TPH | MPH | | TCP flows | | | |

| eNodeB | MME | HSS | DRA | SPGW | PCEF | PCRF | Load Balancer | PAS |
|---|---|---|---|---|---|---|---|---|
| CPU % | CPU % | CPU % | CPU % | CPU % | CPU % | CPU % | CPU % | CPU % |
| Mem % | Mem % | Mem % | Mem % | Mem % | Mem % | Mem % | Mem % | Mem % |
| RRC req | Attach rate | Authentication | Clear Loc | Create session | Gx Trans | TPH | Session | MPH |
| PRB usage | Paging rate | Update Loc | Queue Buffer | Delete session | L4 Trans | Session | Ingress rate | iPCAN Session |
| Accessibility | TAU rate | Purge DB | Purge DB | Modify session | L7 Trans | Latency | Throughput | |
| Retainability | Handover rate | TPH | MPH | | TCP flows | | | |

| eNodeB | MME | HSS | DRA | SPGW | PCEF | PCRF | Load Balancer | PAS |
|---|---|---|---|---|---|---|---|---|
| CPU % | CPU % | CPU % | CPU % | CPU % | CPU % | CPU % | CPU % | CPU % |
| Mem % | Mem % | Mem % | Mem % | Mem % | Mem % | Mem % | Mem % | Mem % |
| RRC req | Attach rate | Authentication | Clear Loc | Create session | Gx Trans | TPH | Session | MPH |
| PRB usage | Paging rate | Update Loc | Queue Buffer | Delete session | L4 Trans | Session | Ingress rate | iPCAN Session |
| Accessibility | TAU rate | Purge DB | Purge DB | Modify session | L7 Trans | Latency | Throughput | |
| Retainability | Handover rate | TPH | MPH | Create PDP | TCP flows | | | |

| eNodeB | MME | HSS | DRA | SPGW | PCEF | PCRF | Load Balancer | PAS |
|---|---|---|---|---|---|---|---|---|
| CPU % | CPU % | CPU % | CPU % | CPU % | CPU % | CPU % | CPU % | CPU % |
| Mem % | Mem % | Mem % | Mem % | Mem % | Mem % | Mem % | Mem % | Mem % |
| RRC req | Attach rate | Authentication | Clear Loc | Create session | Gx Trans | TPH | Session | MPH |
| PRB usage | Paging rate | Update Loc | Queue Buffer | Delete session | L4 Trans | Session | Ingress rate | IPCAN Session |
| Accessibility | TAU rate | Purge DB | Purge DB | Modify session | L7 Trans | Latency | Throughput | |
| Retainability | Handover rate | TPH | MPH | Create PDP | TCP flows | | | |

| eNodeB | MME | HSS | DRA | SPGW | PCEF | PCRF | Load Balancer | PAS |
|---|---|---|---|---|---|---|---|---|
| CPU % | CPU % | CPU % | CPU % | CPU % | CPU % | CPU % | CPU % | CPU % |
| Mem % | Mem % | Mem % | Mem % | Mem % | Mem % | Mem % | Mem % | Mem % |
| RRC req | Attach rate | Authentication | Clear Loc | Create session | Gx Trans | TPH | Session | MPH |
| PRB usage | Paging rate | Update Loc | Queue Buffer | Delete session | L4 Trans | Session | Ingress rate | IPCAN Session |
| Accessibility | TAU rate | Purge DB | Purge DB | Modify session | L7 Trans | Latency | Throughput | |
| Retainability | Handover rate | TPH | MPH | Create PDP | TCP flows | | | |

| eNodeB | MME | HSS | DRA | SPGW | PCEF | PCRF | Load Balancer | PAS |
|---|---|---|---|---|---|---|---|---|
| CPU % | CPU % | CPU % | CPU % | CPU % | CPU % | CPU % | CPU % | CPU % |
| Mem % | Mem % | Mem % | Mem % | Mem % | Mem % | Mem % | Mem % | Mem % |
| RRC req | Attach rate | Authentication | Clear Loc | Create session | Gx Trans | TPH | Session | MPH |
| PRB usage | Paging rate | Update Loc | Queue Buffer | Delete session | L4 Trans | Session | Ingress rate | IPCAN Session |
| Accessibility | TAU rate | Purge DB | Purge DB | Modify session | L7 Trans | Latency | Throughput | |
| Retainability | Handover rate | TPH | MPH | Create PDP | TCP flows | | | |

AUTOMATIC DETECTION AND PREVENTION OF NETWORK OVERLOAD CONDITIONS USING SDN

CROSS-REFERENCE TO RELATED APPLICATIONS

This application is a continuation of co-pending application Ser. No. 14/519,194, entitled "AUTOMATIC DETECTION AND PREVENTION OF NETWORK OVERLOAD CONDITIONS USING SDN," filed on Oct. 21, 2014, issued as U.S. Pat. No. 9,674,046 on Jun. 6, 2017, the contents of which are hereby incorporated by reference herein in their entirety.

TECHNICAL FIELD

The present disclosure relates to the detection and mitigation of overload conditions in communications networks. More specifically, the disclosure is directed to the advance detection of overload conditions in a network implementing software defined networking (SDN) in time to spawn new instances of the affected node.

BACKGROUND

SDN permits the management of network services by network administrators through the abstraction of lower level functionality. The network control plane, which makes decisions about where traffic is sent, is decoupled from the underlying data plane that forwards traffic to the selected destination. The network control plane becomes directly programmable. The underlying infrastructure can be abstracted from applications and network services.

A network using a software defined networking controller node requires a finite amount of time to spawn a new virtual machine (VM) network node in the event of a node failure or congestion. The elapsed time required to create the new node and advertise its existence to the necessary domain name system (DNS) servers is often on the order of minutes to tens of minutes. There is therefore a need in the art to detect or predict network node failure or congestion long before that failure or congestion becomes critical.

SUMMARY

The needs existing in the field are addressed by the present disclosure, which relates to mitigating network overload conditions at a target network node in a communications network.

Exemplary embodiments of the invention feature a method for mitigating such network overload conditions. A controller node of the communications network monitors key performance indicators of a plurality of network nodes related to the target network node. Based on the key performance indicators of the plurality of network nodes related to the target network node, the controller node computes probabilities of failure of each of the network nodes related to the target node.

The controller node also monitors key performance indicators of the target network node. A probability of failure of the target network node is then computed based on the key performance indicators of the target network node and further based on the probabilities of failure of the nodes related to the target network node, weighted by a closeness of relationships to the target network node.

A determination is made that the probability of failure of the target network node exceeds a threshold. Based on that determination, a new instance of the target network node is spawned.

The respective objects and features of the disclosure may be applied jointly or severally in any combination or sub combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EXEMPLARY EMBODIMENTS

Introduction

Described herein is a technique for proactively detecting and subsequently preventing network overload conditions. The present disclosure proposes the implementation of a software defined network (SDN)/network functions virtualization (NFV) application that basically serves two roles. The first role is to make decisions as to when to launch extra virtual nodes. Those decisions are made by combining counters and various relevant key performance indicators (KPIs) from the target node to be protected from overloading, and additionally from each node that is associated with the target node.

The second role of the application is to command servers to launch virtual nodes that can supplement or replicate the node that needs protection. The application may also use OpenFlow-like protocols to program relevant routers to forward or distribute traffic to the new virtual node. The application may also shut down the extra virtual node should the collected data imply that conditions are back to normal levels.

Conventional overload prevention, on the other hand, relies exclusively on counters and KPIs of the same node (the target node) that needs protection. Thus conventional detection methods are not conducive to overload prevention using virtual nodes.

The disclosed technique mitigates network overload conditions, such as an overloaded DIAMETER routing agent (DRA), while reducing capital expenditures and operating expenses. As the technique relies on launching virtual nodes on demand to prevent overloading, it is required that the detection take place way ahead (minutes to tens of minutes) of the time that actual overloading of the node takes place. That allows sufficient time for the virtual node to boot up and perform checks before becoming operational.

The solution allows for better service to network customers, reduces trouble tickets, and reduces churn. The solution additionally reduces capital expenditures, as it proposes to use virtual nodes as supplementary nodes. It also reduces operating expenses because it minimizes manual intervention. In comparison to conventional methods, the solution offers lower false positive detection rate, and faster detection time.

Details

The network nodes discussed herein in connection with the described technique are "soft" nodes, such as a DIAMETER routing agent, deployed on virtual machines. The technique is performed, at least in part, by a controller node that gathers data from the nodes that are relevant to the instance of the overload-protected network node. The controller node also decides how to mitigate an overload. As such, the controller node plays a role similar to that of the SDN controller—while the SDN controller determines optimal routes, the presently described controller prevents overloads.

The described mitigation technique relies on elasticity, such as that deployed in cloud services such as the Amazon's AWS™ (Amazon Web Services™) Once a certain "threshold" is breached, the controller node will cause a new instance to be spawned, and will also notify the support nodes (such as DNS) to make the new instance become accessible to the network.

A focus of the present disclosure is the detection method. A more effective detection method is needed in a network with SDN. KPIs that are traditionally used as a threshold for detecting overload conditions (such as CPU utilization) are too volatile, thus frequently causing false alarms. Setting traditional KPI threshold values too low increases network maintenance cost. Setting KPI threshold values too high renders it too late to spawn new instances. Further, as a general rule, overloads are notoriously difficult to predict.

Every network element has a myriad of counters and KPIs. Not all of those can equally predict an overload situation. The KPIs must instead be selected based on their usefulness to the scenario. For example, an attach storm causing a home subscriber server (HSS) overload would be characterized by a high attach rate at the mobility management entity (MME), and a large number of AIR/authentication, authorization and accounting (AAA) messages at the DRA.

The presently described detection method relies on the analysis of data collected from not just the target PCRF, but from all network nodes that are related to the particular target PCRF. To be precise, it predicts the overload by combining together the probability of failure of the target node and each associated node in a weighted manner. The weight depends on the aggregation level, call flow relationship, and topology.

In the model, each node is classified as a source node or an intermediate node. Source nodes are nodes that are at the edge of the network, such as an eNodeB. The probability of failure of a source node such as an eNodeB relies on, for example, the level of attached user equipment (UEs). The probability of failure of a source node does not, however, depend on any information from nodes other than from itself. On the other hand, the probability of failure for an intermediate node depends on information from the source nodes or other intermediate nodes on which the intermediate node depends, as well as information from itself. Such dependency percolates up the chain.

Figure 1:
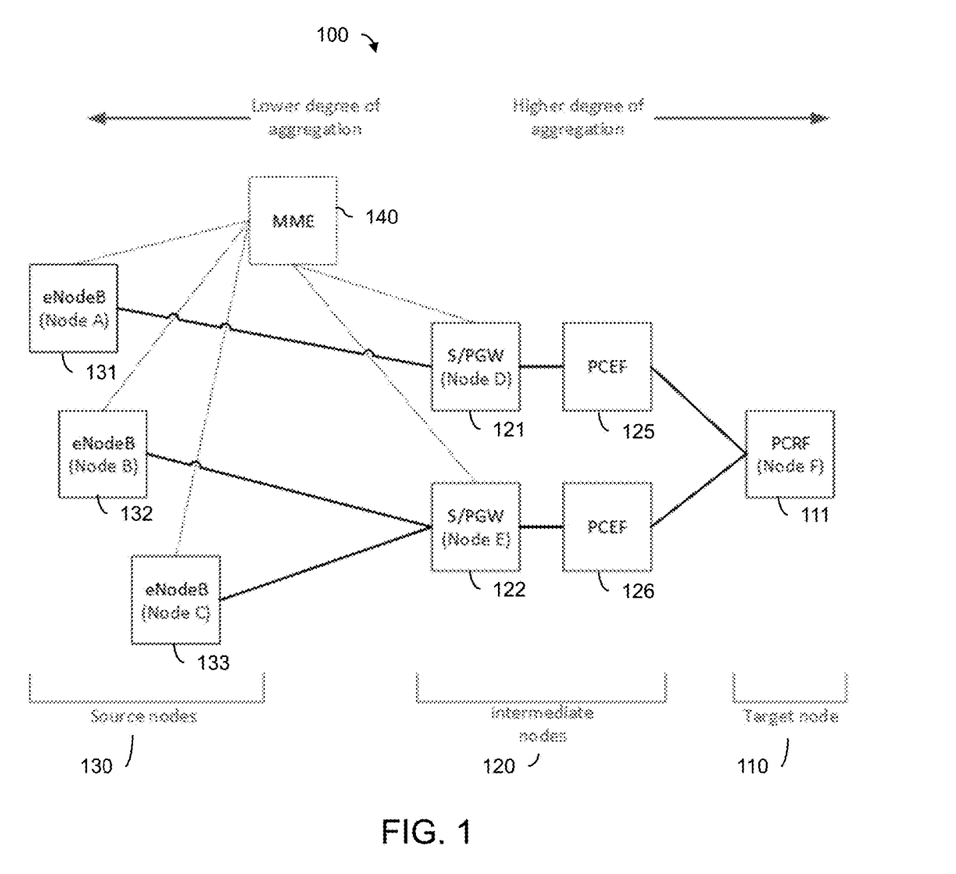
FIG. 1 is a schematic block diagram showing a communications network to which aspects of the presently disclosed technique may be applied.

The dependencies may be represented as mathematical expressions. To do that, an example cellular telephone network 100 implementing SDN is shown in FIG. 1. In the figure, the nodes 131, 132, 133 are source nodes 130. For example, the nodes 131, 132, 133 may represent eNodeB elements associated with cell towers and connecting with mobile user equipment (not shown). The intermediate nodes 120 include serving gateway/public data network gateway (S/PGW) nodes 121, 122 and path computation element function (PCEF) nodes 125, 126 in a cellular network. The S/PGW nodes 121, 122 may be connected to a load balancer (not shown) for regulating throughput, and may further be connected to a policy access server (PAS) node.

The target node 110 is a policy charging and rules function (PCRF) node 111. A MME 140 oversees attachment and other interactions between the source nodes 131, 132, 133 and the S/PGW nodes 121, 122. The MME 140 is additionally responsible for authentication of users via a HSS node (not shown). The nodes in the example network are interconnected as shown in FIG. 1.

The probability of failure of each of the nodes depends on information from that node together with weighted information from nodes downstream from that node. For notation purposes, the source nodes 131, 132, 133 are denoted herein as nodes A, B, C, respectively; the intermediate nodes 121, 122 are denoted nodes D, E, and the target node 111 is denoted node F. Let $I_a$ denote the information available from node A, and P(A) the probability of failure of node A. The foregoing discussion can be captured by expressing the probabilities of failure of several example nodes. The probability of failure of a source nodes such as node A is a function solely of information available from itself:

$$P(A)=f(I_A).$$

The probability of failure of an intermediate node such as node D depends on information on itself as well as on the probability of failure of the source node A it connects to:

$$P(D)=f(I_D,P(A)).$$

The intermediate node E is connected to two source nodes B and C, so the probability of failure of E depends on information on itself as well as the probability of failure of both dependent nodes:

$$P(E)=f(I_E,P(B),P(C)).$$

The probability of the target node's failure depends on information from the target node as well as on the probabilities of failure both the nodes D and E:

$$P(F)=f(I_F,P(D),P(E)).$$

Note that the probability of failure of nodes may differ from market to market, and may also depend on an equipment vendor. For example, the probability of failure for an ALU®-manufactured node may differ from that of an Ericsson®-manufactured node. It is possible to incorporate that fact into the model by letting the function vary according to the manufacturer. For example, setting $f=f_{ALU}$ for ALU® and $f=f_{Ericsson}$ for Ericsson®.

The control node continuously computes and monitors P(F). As the time for overload conditions to propagate over the network is non-trivial, it is believed that the presently described method to predict can compute the probability of failure sufficiently in advance so as to support the spawn and setup of supplementary target node(s).

Network Outage Example

An example of the events taking place during a typical network outage is presented below with reference to FIGS. 1-8. The example network 100 shown in FIG. 1 illustrates the interconnections of the various nodes at different functionality and aggregation levels in the network.

Each of the tables shown in FIGS. 2-8 is a KPI table for the various interconnected nodes described above. Each KPI table is coded to show a status of the KPIs for each node: unshaded indicates normal KPI levels, grey indicates a potential problem, and black depicts crossing threshold limits and failure.

The sequence of KPI tables shown in FIGS. 2-8 illustrates the propagation of a problem and its eventual resolution in a state-of-the-art network using SDN. Each will be discussed in turn, followed by a description of how a system according to the present disclosure would resolve the same problem. In the following descriptions, "T0" is the time that alarms go out to network operators, "T−n" indicates a time where n is a step number before T0, and "T+n" denotes step n after T0.

Figure 2:
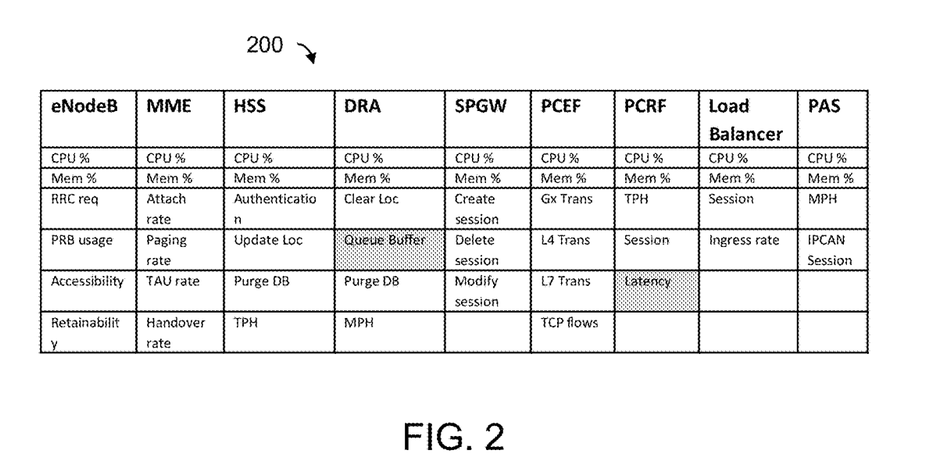
FIG. 2 is a key performance indicator table showing performance indicators for elements of the network of FIG. 1 at time T−3 relative to the generation of alarms.
Figure 3:
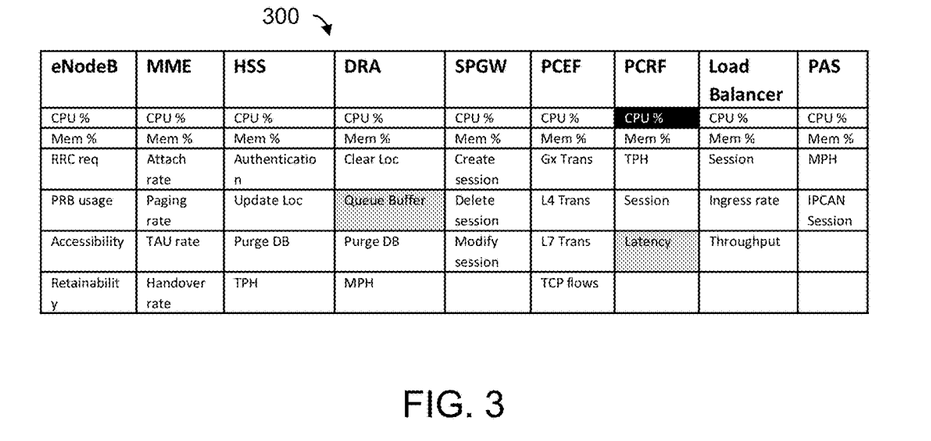
FIG. 3 is a key performance indicator table showing performance indicators for elements of the network of FIG. 1 at time T−2.

The KPI table 200 of FIG. 2 shows various indicators for the network nodes at time T−3. The PCRF starts reporting large latency across all of its interfaces and the queue buffer of the DRA reaches 90%. Both are depicted as potential problems in the KPI table 200. In the KPI table 300 of FIG. 3, which shows the KPIs at time T−2, large latency in the PCRF and near capacity of the queue buffer of the DRA continue. The PCRF front-end servers experience a sudden spike in CPU usage (40% to 100%), triggering a failure indicator for that KPI.

Figure 4:
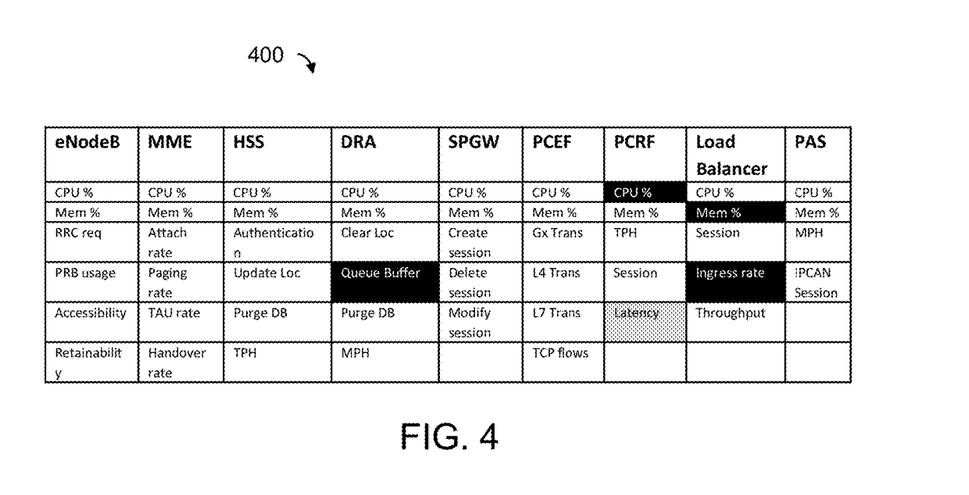
FIG. 4 is a key performance indicator table showing performance indicators for elements of the network of FIG. 1 at time T−1.

At time T−1, depicted by KPI table 400 of FIG. 4, the load balancer sees a jump in ingress traffic (due to the PCRF issue), which triggers a memory bug causing the load balancer to crash.

Figure 5:
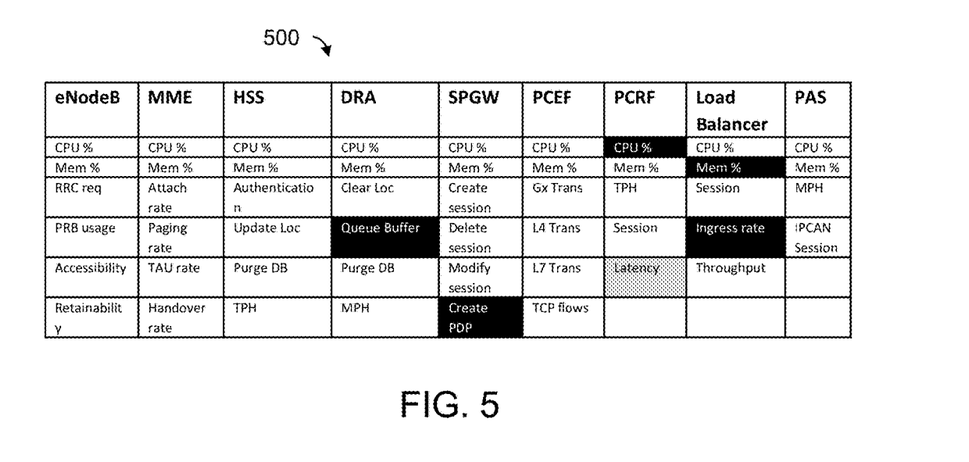
FIG. 5 is a key performance indicator table showing performance indicators for elements of the network of FIG. 1 at time T0.

The KPI table 500 of FIG. 5 represents network conditions at time T0. Packet data protocol (PDP) failure rates for Phone, Broadband, PTA, and LWAActivate access point names (APNs) jump from 0% to 91%, significantly driving up PDP create requests across all active public data network gateway (PGW) nodes. At this point, network operations is notified and begins taking steps to recover the network.

Figure 6:
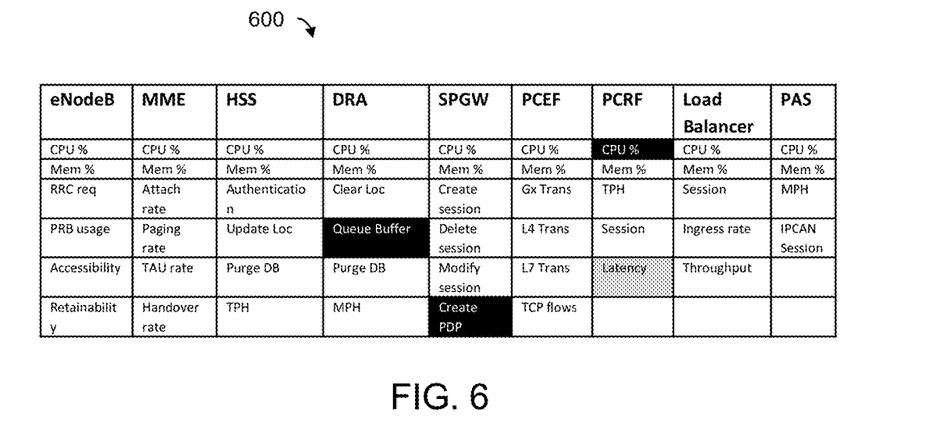
FIG. 6 is a key performance indicator table showing performance indicators for elements of the network of FIG. 1 at time T+1.
Figure 7:
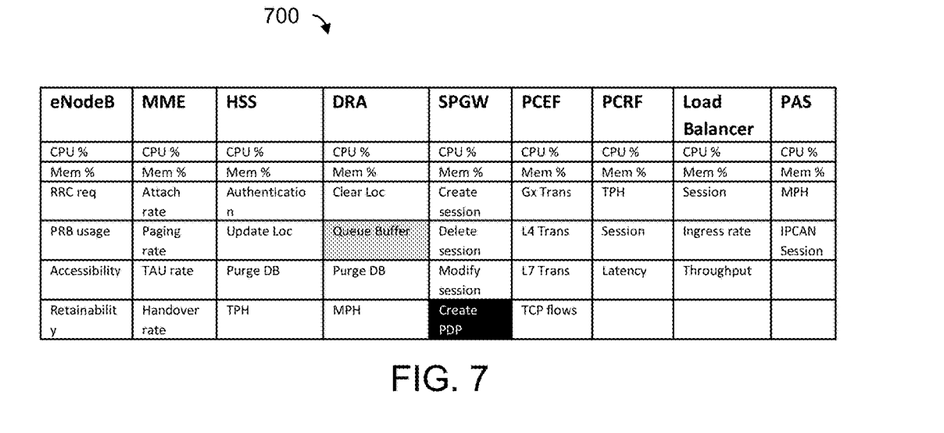
FIG. 7 is a key performance indicator table showing performance indicators for elements of the network of FIG. 1 at time T+2.
Figure 8:
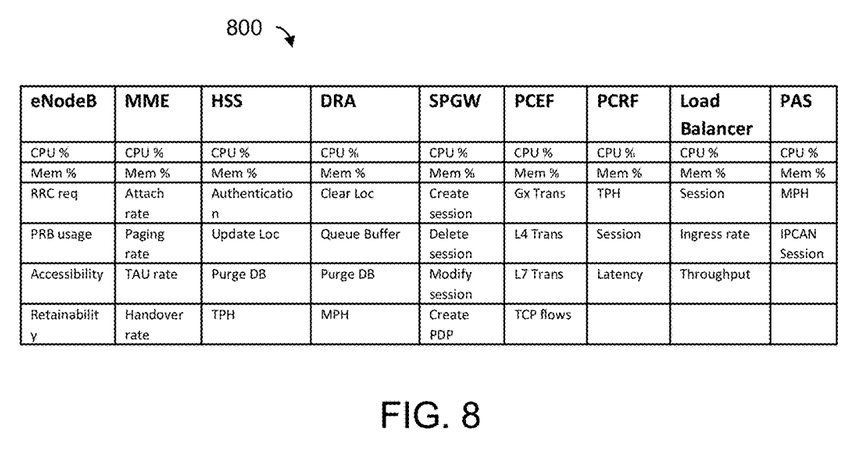
FIG. 8 is a key performance indicator table showing performance indicators for elements of the network of FIG. 1 at time T+3.

At time T+1, depicted by KPI table 600 of FIG. 6, operations restarts the load balancer and stabilizes the platform. Operations restarts PCRF at time T+2, depicted by KPI table 700 of FIG. 7, and the CPU utilization and latency of the PCRF return to normal levels. At time T+3, depicted by KPI table 800 of FIG. 8, PDP rejection and creation rates start to return to normal levels.

At time T+4 (not shown), the SPGW reports that PDP success rates for LTE remain well below threshold and that the main failure cause code indicated a "DRA" issue. MME traffic migration and PDP success rates finally return to normal at time T+5.

The outcome is considerable improved if the presently described approach is applied to this case. At the point in time T−1, represented by the KPI table 400 of FIG. 4, the above-described controller node backtracks from the PCRF issue to determine that the DRA is the source of the problem, with a computed probability. The controller node then spawns a new DRA and sends a report on the problem. In the presently disclosed approach, the new DRA mitigates the problem and prevents further propagation of the congestion. The report helps in long-term resolution of the issue.

The early warning provided by the presently disclosed approach leads to a faster response time. For example, in the above-described case, the illustrated state-of-the-art technique resolves at time T+1 (illustrated by the KPI table 600 of FIG. 6). The presently described approach resolves the problem at time (T−1) (illustrated by the KPI table 400 of FIG. 4), wherein the controller node predicts the problem and spawns a new DRA.

The presently described approach automatically mitigates the problem without manual intervention, and with a higher degree of detection accuracy (reduced false positives) and resolution than that of the state of the art.

Example Method

Figure 9:
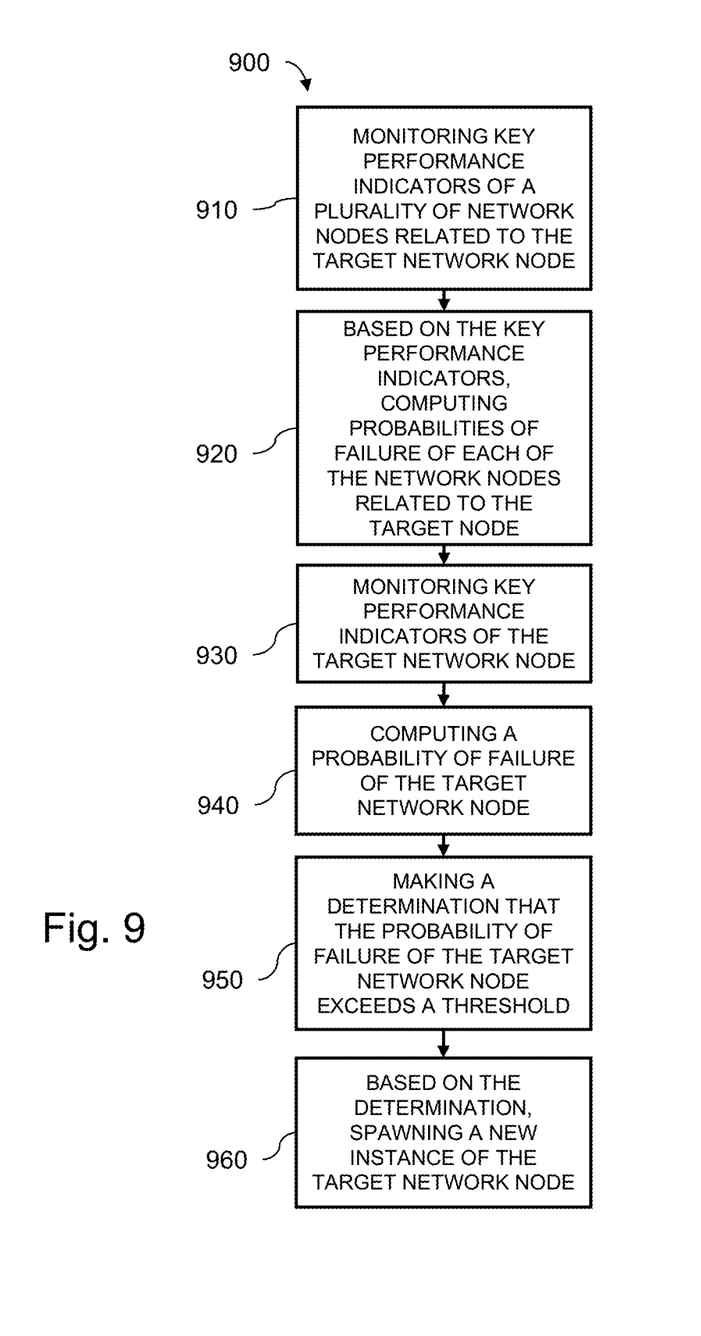
FIG. 9 is a flow chart showing operations in a technique according to aspects of the present disclosure.

A method for mitigating network overload conditions at a target network node in accordance with the disclosed technique is illustrated by the flow chart 900 of FIG. 9. The method is performed by a controller node of a communications network; the controller node may, for example, be a PCRF.

Key performance indicators of a plurality of network nodes related to the target network node are monitored at block 910 by the controller node. Based on the key performance indicators, probabilities of failure of each of the network nodes related to the target node are computed at block 920. The computation for a particular network node may further be based on probabilities of failure of the nodes related to the particular network node, weighted by a closeness of relationships to the particular network node. The target node may be a PCRF, and the related nodes may be eNodeB edge nodes and intermediate nodes.

Key performance indicators of the target network node are also monitored by the controller node at block 930. A probability of failure of the target network node is then computed at block 940 by the controller node based on the key performance indicators of the target network node and further based on the probabilities of failure of the nodes related to the target network node, weighted by a closeness of relationships to the target network node. The probabilities of failure may, for example, be weighted by a closeness of relationships to the target network node including aggregation level, call flow relationship and topography.

A determination may then be made at block 950 that the probability of failure of the target network node exceeds a threshold. Based on that determination, a new instance of the target network node is spawned at block 960.

A support node of the communication network may then be notified that the new instance is accessible to the communications network. The support node may, for example, be a domain name system server.

System

Figure 10:
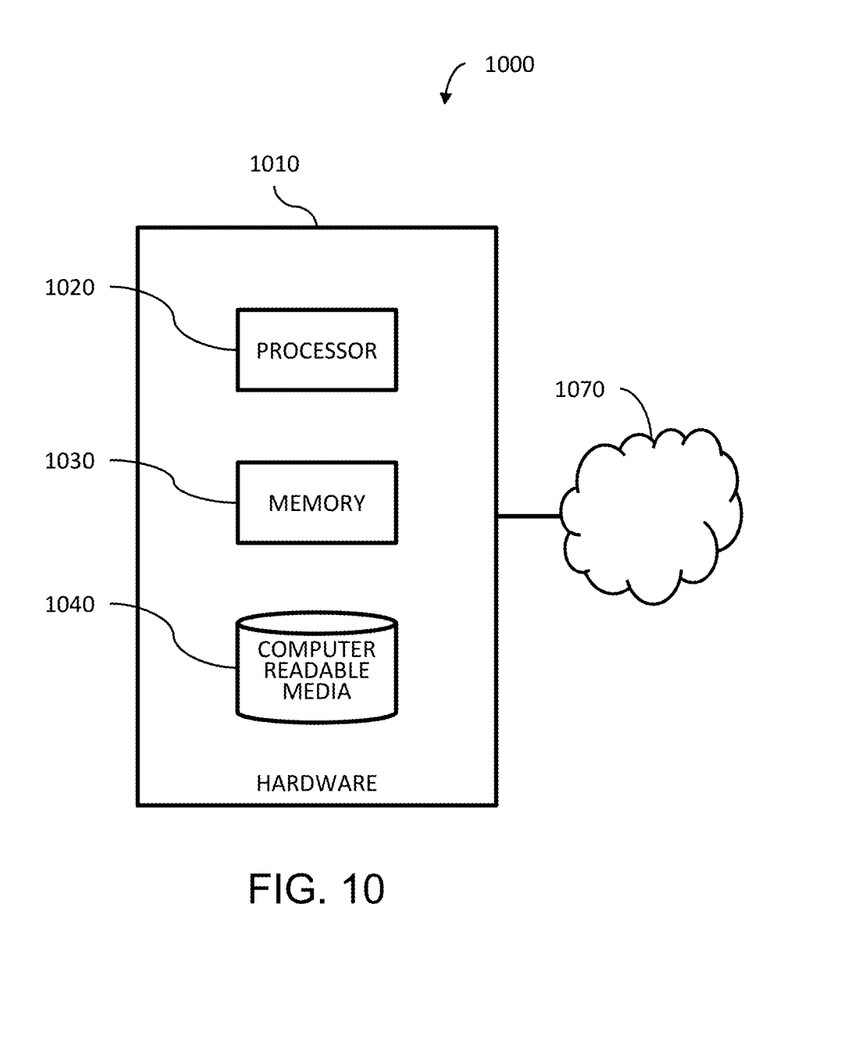
FIG. 10 is a schematic diagram showing a control node in accordance with aspects of the present disclosure.

The control node as described above may be implemented in computer hardware comprising a stand-alone unit or a plurality of units linked by a network or a bus. For example, the control node described above may be instantiated using computing systems such as the exemplary computing system 1000 is shown in FIG. 10.

A computing apparatus 1010 may be a mainframe computer, a desktop or laptop computer or any other device or group of devices capable of processing data. The computing apparatus 1010 receives data from any number of data sources that may be connected to the apparatus. For example, the computing apparatus 1010 may receive input from a wide area network 1070 such as the Internet, via a local area network or via a direct bus connection.

The computing apparatus 1010 includes one or more processors 1020 such as a central processing unit (CPU) and further includes a memory 1030. The processor 1020 is configured using software according to the present disclosure.

The memory 1030 functions as a data memory that stores data used during execution of programs in the processor 1020, and is also used as a program work area. The memory 1030 also functions as a program memory for storing a program executed in the processor 1020. The program may reside on any tangible, non-volatile computer-readable media 1040 as computer readable instructions stored thereon for execution by the processor to perform the operations.

Generally, the processor 1020 is configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software and the computer program code required to implement the foregoing can be developed by a person of ordinary skill in the art.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude propagated signals, which are not tangible and are not non-transitory. Cached information is considered to be stored on a computer-readable medium. Common expedients of computer-readable media are well-known in the art and need not be described in detail here.

CONCLUSION

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed is:

1. A method for predicting a network overload condition at a target network node in a communications network, the target network node being a policy and charging rules function node, the method comprising:

collecting key performance indicators from a plurality of source network nodes, the source network nodes being edge nodes;

based on the key performance indicators collected from the plurality of source network nodes, computing probabilities of failure of each of the source network nodes;

collecting key performance indicators from a plurality of intermediate network nodes, the intermediate network nodes including at least one of a gateway node and a path computation element function node, each intermediate network node receiving information from at least one of the source network nodes;

based on the key performance indicators collected from the intermediate network nodes, and further based on the probabilities of failure of the source network nodes from which information is received, computing probabilities of failure of each of the intermediate network nodes;

collecting key performance indicators from the target network node, the target network node receiving information from the intermediate network nodes;

by a controller node of the communications network, predicting the network overload condition when a probability of failure P(F) of the target network node exceeds a threshold, the probability of failure of the target network node being a function of the key performance indicators $I_F$ of the target network node and further being a function of the probabilities of failure P(D), P(E) of the intermediate network nodes, weighted by a closeness of relationships of the intermediate network nodes to the target network node;

wherein the probability of failure of the target network node is described by $$P(F)=f(I_F,P(D),P(E))$$

wherein the function $f$ is varied according to a manufacturer of the target node.

2. The method of claim 1, wherein the probabilities of failure of each of the source network nodes are computed without using information from other nodes.

3. The method of claim 1, wherein the closeness of relationships to the target network node includes an aggregation level and topography of the intermediate network node.

4. The method of claim 1, further comprising:
by the controller node of the communications network, backtracking from the network overload condition of the target network node to determine a node that is a probable source of the network overload condition;
based on predicting the network overload condition, spawning a new instance of the node that is the probable source of the network overload condition; and
notifying a support node of the communication network that the new instance is accessible to the communications network.

5. The method of claim 4 wherein the support node is a domain name system server.

6. The method of claim 1 wherein the controller node is a Diameter routing agent.

7. A network controller node of a communications network, comprising:
at least one processor;
at least one network interface; and
at least one computer readable storage device having stored thereon computer readable instructions that, when executed by the at least one processor, cause the at least one processor to perform operations for predicting a network overload condition at a target network node in the communications network, the target network node being a policy and charging rules function node, the operations comprising:
collecting key performance indicators from a plurality of source network nodes, the source network nodes being edge nodes;
based on the key performance indicators collected from the plurality of source network nodes, computing probabilities of failure of each of the source network nodes;
collecting key performance indicators from a plurality of intermediate network nodes, the intermediate network nodes including at least one of a gateway node and a path computation element function node, each intermediate network node receiving information from at least one of the source network nodes;
based on the key performance indicators collected from the intermediate network nodes, and further based on the probabilities of failure of the source network nodes from which information is received, computing probabilities of failure of each of the intermediate network nodes;
collecting key performance indicators from the target network node, the target network node receiving information from the intermediate network nodes;
predicting the network overload condition when a probability of failure P(F) of the target network node exceeds a threshold, the probability of failure of the target network node being a function of the key performance indicators $I_F$ of the target network node and further being a function of the probabilities of failure P(D), P(E) of the intermediate network nodes, weighted by a closeness of relationships of the intermediate network nodes to the target network node;
wherein the probability of failure of the target network node is described by $$P(F)=f(I_F,P(D),P(E))$$

wherein the function $f$ is varied according to a manufacturer of the target node.

8. The network controller node of claim 7, wherein the probabilities of failure of each of the source network nodes are computed without using information from other nodes.

9. The network controller node of claim 7, wherein the closeness of relationships to the target network node includes an aggregation level and topography of the intermediate network node.

10. The network controller node of claim 7, wherein the operations further comprise:
backtracking from the network overload condition of the target network node to determine a node that is a probable source of the network overload condition;
based on predicting the network overload condition, spawning a new instance of the node that is the probable source of the network overload condition; and
notifying a support node of the communication network that the new instance is accessible to the communications network.

11. The network controller node of claim 10, wherein the support node is a domain name system server.

12. The network controller node of claim 7, wherein the controller node is a Diameter routing agent.

13. A non-transitory computer-readable medium having stored thereon computer readable instructions for predicting a network overload condition at a target network node in a communications network, the target network node being a policy and charging rules function node, wherein execution of the computer readable instructions by a processor causes the processor to perform operations comprising:
collecting key performance indicators from a plurality of source network nodes, the source network nodes being edge nodes;
based on the key performance indicators collected from the plurality of source network nodes, computing probabilities of failure of each of the source network nodes;
collecting key performance indicators from a plurality of intermediate network nodes, the intermediate network nodes including at least one of a gateway node and a path computation element function node, each intermediate network node receiving information from at least one of the source network nodes;
based on the key performance indicators collected from the intermediate network nodes, and further based on the probabilities of failure of the source network nodes from which information is received, computing probabilities of failure of each of the intermediate network nodes;
collecting key performance indicators from the target network node, the target network node receiving information from the intermediate network nodes;
predicting the network overload condition when a probability of failure P(F) of the target network node exceeds a threshold, the probability of failure of the target network node being a function of the key performance indicators $I_F$ of the target network node and further being a function of the probabilities of failure P(D), P(E) of the intermediate network nodes, weighted by a closeness of relationships of the intermediate network nodes to the target network node;
wherein the probability of failure of the target network node is described by $$P(F)=f(I_F,P(D),P(E))$$

wherein the function $f$ is varied according to a manufacturer of the target node.

14. The non-transitory computer-readable medium of claim 13, wherein the probabilities of failure of each of the source network nodes are computed without using information from other nodes.

15. The non-transitory computer-readable medium of claim 13, wherein the closeness of relationships to the target network node includes an aggregation level and topography of the intermediate network node.

16. The non-transitory computer-readable medium of claim 13, further comprising:
   backtracking from the network overload condition of the target network node to determine a node that is a probable source of the network overload condition;
   based on predicting the network overload condition, spawning a new instance of the node that is the probable source of the network overload condition; and
   notifying a support node of the communication network that the new instance is accessible to the communications network.

17. The non-transitory computer-readable medium of claim 16, wherein the support node is a domain name system server.

* * * * *